Feb. 25, 1958 L. CHEVRETTE 2,824,593
NONSKID CHAIN
Filed March 18, 1955
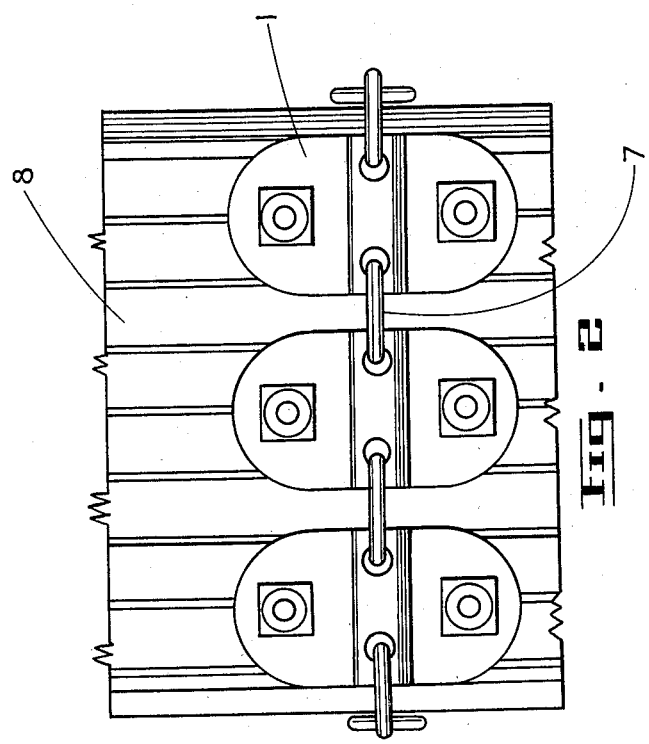
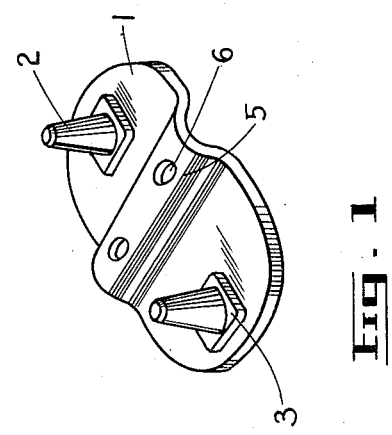
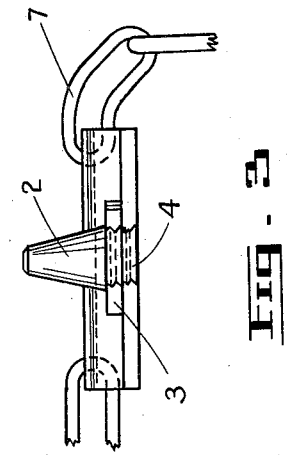
INVENTOR
LOUIS CHEVRETTE
ATTORNEY

United States Patent Office 2,824,593
Patented Feb. 25, 1958

2,824,593
NONSKID CHAIN

Louis Chevrette, Sudbury, Ontario, Canada

Application March 18, 1955, Serial No. 495,235

1 Claim. (Cl. 152—245)

This invention relates generally to improvements in non-skid devices, and in particular to novel and improved non-skid cross chain links which can be readily and conveniently applied to an automobile tire, and which when applied serve effectually to prevent side slipping, and skidding.

An object of this invention is to provide an anti-skid cross chain for an automobile tire comprising a plurality of plates with anti-skidding means attached thereto connected by links, and extending transversely across the periphery of said tire.

Another object of the invention is the provision of anti-skid plates having calks secured thereto, and in which said plates are adapted to lie flat on the surface of a tire.

A still further object of this invention is the provision of non-skid cross chains which are simple and economical to manufacture, durable, and efficient in use, and readily replaced when worn, or broken.

These and other objects and advantages of the invention will appear more fully hereinafter from a consideration of the detailed description which follows having regard to the accompanying drawings forming part of the specification by way of example, in which:

Figure 1 is a perspective view of my improved anti-skid plate, or tread member.

Figure 2 is a plan view of the anti-skid plates in assembled position across the periphery of an automobile tire, and Figure 3 is a view of an anti-skid plate in side elevation showing a calk partially in section secured thereto.

Referring now to the figures of the drawings my improved non-skid device comprises a plate 1, provided with calks 2, having a bearing base 3, secured to said plate centrally at 4, said calks being either threaded for removal when worn, or welded to the plate if desired, said plate 1, is formed oblong in shape having rounded ends, and centrally of its length is provided with a transversely constructed convex portion 5, having apertures 6, to accommodate links 7. In use a plurality of plates 1, are connected together by links 7, to form an anti-skid cross chain, and secured transversely to the periphery of a tire 8, as shown in Figure 2. Plate 1, is provided with the convex portion 5, to accommodate links 7, in such manner that they are clear of the surface of the tire, as shown clearly in Fig. 3, so that the plate may have a flat bearing surface on the tire. By this construction the tire tread will escape damage from cutting by the connecting links 7, and the plates will wear longer due to the provision of a greater bearing surface.

Without further detailed description it will be seen that I have provided an anti-skid cross chain having link-connected plates which are long wearing, and cause very little tire damage, and may be attached to a tire either as a unit, or as a series of cross chains around the circumference in the usual manner with side chains.

While the preferred embodiment of the invention has been disclosed it is understood that minor changes in the details of construction, combination, and arrangement of parts may be resorted to by those skilled in the art without departing from the spirit and scope of the invention, as set forth in the appended claim.

The embodiments of the invention in which an exclusive property or privilege is claimed are defined as follows.

I claim:

In an anti-skid device, the combination with the cross chains of an automobile tire chain, of a tread plate of substantially rectangular shape having its central portion raised to form a transverse U-shape channel having vertical openings in its bight portion adjacent each end to receive a link of the cross chain disposed within the channel, said channel being of sufficient depth to support the link above the plane of the bottom face of said plate and calks secured to the upper face of said plate on opposite sides of said channel extending upwardly above the bight of the channel.

References Cited in the file of this patent

UNITED STATES PATENTS

| 1,115,692 | Lauffer | Nov. 3, 1914 |
| 1,312,483 | Kittelson | Aug. 5, 1919 |
| 2,178,041 | Hodell | Oct. 31, 1939 |
| 2,583,624 | Bartoletti | Jan. 20, 1952 |

FOREIGN PATENTS

| 1,051,887 | France | Sept. 23, 1953 |